US008462416B2

(12) United States Patent
Yoon et al.

(10) Patent No.: US 8,462,416 B2
(45) Date of Patent: Jun. 11, 2013

(54) MICRO-SHUTTER AND DISPLAY APPARATUS HAVING THE SAME

(75) Inventors: Seon-Tae Yoon, Seoul (KR); Gunwoo Kim, Yongin-si (KR); Jae Byung Park, Seoul (KR); Hyun Min Cho, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 674 days.

(21) Appl. No.: 12/700,533

(22) Filed: Feb. 4, 2010

(65) Prior Publication Data
US 2011/0043882 A1 Feb. 24, 2011

(30) Foreign Application Priority Data

Aug. 21, 2009 (KR) ........................ 10-2009-0077649

(51) Int. Cl.
*G02B 26/02* (2006.01)
(52) U.S. Cl.
USPC .............. 359/233; 359/230; 345/84; 345/109
(58) Field of Classification Search
USPC ................................................. 359/230, 233
See application file for complete search history.

(56) References Cited

U.S. PATENT DOCUMENTS
7,502,159 B2 * 3/2009 Hagood et al. ................ 359/290

FOREIGN PATENT DOCUMENTS
KR 10-2007-0114161 11/2007
WO WO 2006/091791 8/2006

OTHER PUBLICATIONS
English Abstract for Publication No. 10-2007-0114161.

* cited by examiner

*Primary Examiner* — James Phan
(74) *Attorney, Agent, or Firm* — F. Chau & Associates, LLC

(57) ABSTRACT

A micro-shutter includes a reflective layer, a shutter, and a first actuator. The reflective layer includes a plurality of first openings transmitting a portion of external light, and reflecting the remaining portion of the external light. The shutter includes a plurality of second openings corresponding to the first openings to transmit the portion of the external light. The first actuator is provided at one side of the shutter and includes at least three electrodes. The first actuator adjusts an overlap area between the first openings and the second openings according to a level of a voltage applied to the actuator electrodes.

20 Claims, 18 Drawing Sheets

MICRO-SHUTTER AND DISPLAY APPARATUS HAVING THE SAME

CROSS-REFERENCE TO RELATED APPLICATION

This application claims priority from Korean Patent Application No. 10-2009-0077649 filed on Aug. 21, 2009, the contents of which are herein incorporated by reference in their entirety.

BACKGROUND OF THE INVENTION

1. Field of the Invention

The present disclosure is directed to a micro-shutter and a display apparatus having the same. More particularly, the present disclosure is directed to a micro-shutter capable of representing various gray scales according to the position of a shutter and a display apparatus having the same.

2. Description of the Related Art

To increase a response speed of a display apparatus, a micro-shutter display employing a micro-shutter has been developed as part of an micro-electromechanical system (MEMS). The micro-shutter has a physical property that changes its form upon application of an external power source. A micro-shutter display apparatus transmits or blocks light by using the physical property of the micro-shutter. Accordingly, a micro-shutter display has a fast response speed with respect to a low driving voltage.

However, since a micro-shutter can only either transmit or block light, only two gray scales can be represented.

SUMMARY OF THE INVENTION

An exemplary embodiment of the present invention provides a micro-shutter to display a plurality of gray scales.

Another exemplary embodiment of the present invention also provides a display apparatus to display various gray scales.

According to an exemplary embodiment of the present invention, a micro-shutter includes a reflective layer, a shutter, and a first actuator. The reflective layer includes a plurality of first openings transmitting a portion of external light, and reflecting the remaining portion of the external light. The shutter includes a plurality of second openings corresponding to the first openings to transmit the portion of the external light. The first actuator is provided at one side of the shutter and includes at least three electrodes. The first actuator adjusts an overlap area between the first openings and the second openings according to a level of a voltage applied to the electrodes, to represent at least three gray scales.

The first actuator includes a first compliant electrode, a second compliant electrode, and a third compliant electrode. The second compliant electrode is adjacent to the first compliant electrode. The third compliant electrode is adjacent to the second compliant electrode which is interposed between the third compliant electrode and the first compliant electrode, and connected with the shutter. If a first voltage is applied to the second compliant electrode, the second compliant electrode is connected with the third compliant electrode to move the shutter into a first position. If a second voltage greater than the first voltage is applied to the first compliant electrode, the first to third compliant electrodes are connected with one another to move the shutter into a second position. The overlap area between the first openings and the second openings are adjusted by the movement of the shutter.

A second actuator having the same structure as that of the first actuator may be further provided at an opposite side of the shutter. The second actuator includes at least three electrodes. The second actuator adjusts the overlap area between the first openings and the second openings together with the first actuator according to a level of a voltage applied to the electrodes, to represent a plurality of gray scales.

The second actuator comprises a fourth compliant electrode, a fifth compliant electrode, and a sixth compliant electrode. The fifth compliant electrode is adjacent to the fourth compliant electrode. The sixth compliant electrode is adjacent to the fifth compliant electrode which is interposed between the sixth compliant electrode and the fourth compliant electrode, and connected with the shutter. If a first voltage is applied to the fifth compliant electrode, the fifth compliant electrode is connected with the sixth compliant electrode to move the shutter into a third position. If a second voltage greater than the first voltage is applied to the fourth compliant electrode, the fourth to sixth compliant electrodes are connected with one another to move the shutter into a fourth position. The overlap area between the first openings and the second openings are adjusted by the movement of the shutter.

The first openings may have different sizes. The first openings may include first sub openings having a first size, and second sub openings having a size smaller than the first size. The second sub opening may have an area corresponding to 25% of an area of the first sub opening.

The second openings may have a size and a shape identical to a size and a shape of the first openings.

According to another embodiment of the present invention, a display apparatus includes a substrate and the micro-shutters. The substrate has a plurality of pixel areas defined therein. The micro-shutters are formed in the pixel areas.

The first and second actuators may be driven independently from each other. When the first and second actuators are driven independently from each other, a first transistor may be coupled with the first actuator to drive the first actuator, and a second transistor may be coupled with the second actuator to drive the second actuator. The first transistor is connected with the first and second compliant electrodes of the first actuator, and the second transistor is connected with the fourth and fifth compliant electrodes of the second actuator.

In still another embodiment of the present invention, the display apparatus includes a first transistor, a first sub transistor, a second transistor, and a second sub transistor. The first transistor is connected with the first compliant electrode of the first actuator to drive the first compliant electrode. The first sub transistor is connected with the second compliant electrode of the first actuator to drive the second compliant electrode. The second transistor is connected with the fourth compliant electrode of the second actuator to drive the fourth compliant electrode. The second sub transistor is connected with the fifth compliant electrode of the second actuator to drive the fifth compliant electrode.

The substrate is provided adjacent thereto with a light source supplying the external light to the substrate.

According to the above, a micro-shutter according to various embodiments of the present invention can represent a plurality of gray scales. A display apparatus using a micro-shutter according to an embodiment of the invention can represent a plurality of gray scales with a reduced number of micro-shutters, improving display quality.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout.

Hereinafter, a display apparatus according to exemplary embodiments of the present invention will be described with reference to accompanying drawings.

Figure 1:
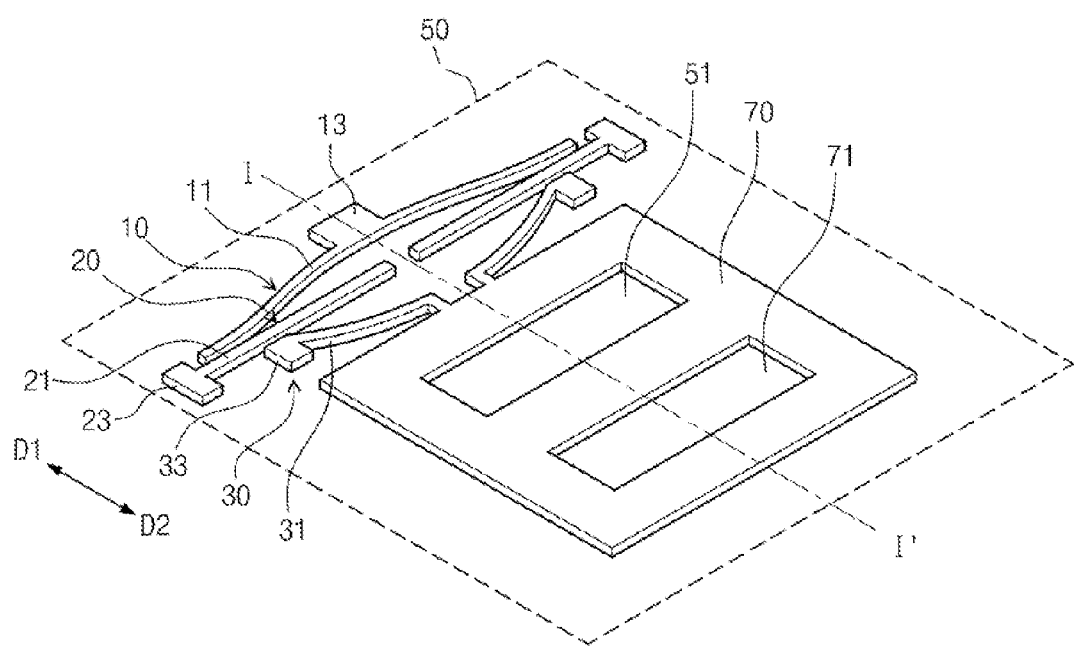
FIG. 1 is a perspective view showing a micro-shutter according to a first exemplary embodiment of the present invention.
Figure 2:
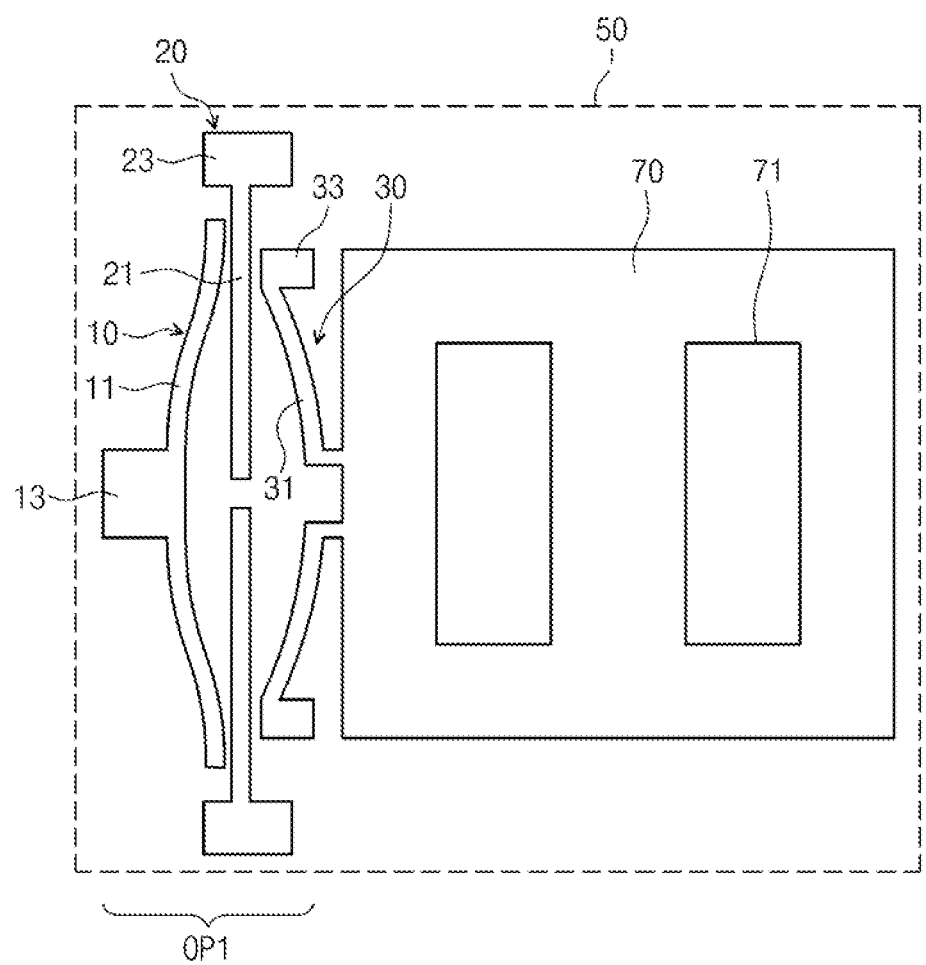
FIG. 2 is a plan view showing the micro-shutter of FIG. 1.
Figure 3:
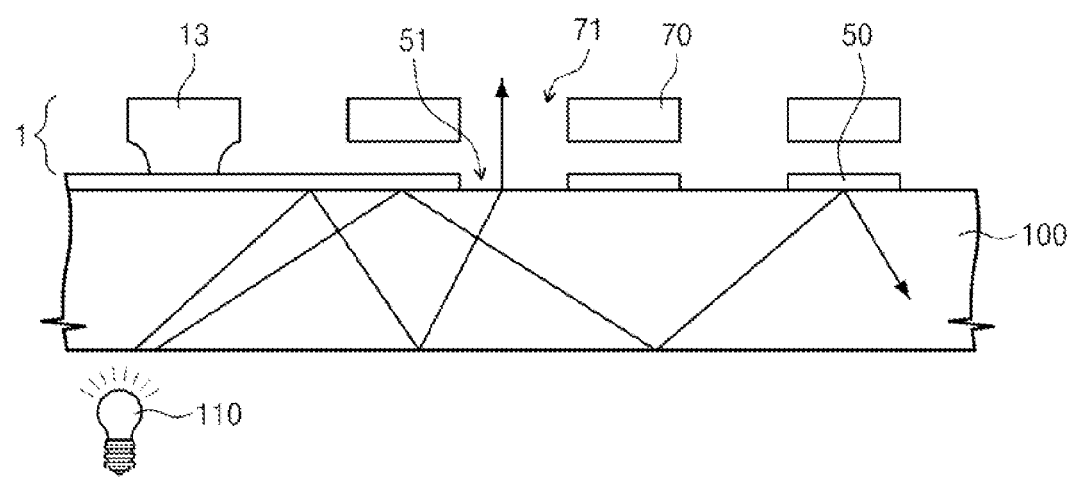
FIG. 3 is a sectional view taken along line I-I' of FIG. 1.

FIG. 1 is a perspective view showing a micro-shutter according to an exemplary embodiment of the present invention, and FIG. 2 is a plan view showing the micro-shutter of FIG. 1. FIG. 3 is a sectional view taken along line I-I' of FIG. 1.

Referring to FIGS. 1 to 3, the micro-shutter according to the first exemplary embodiment of the present invention includes a substrate 100, a reflective layer 50, and a shutter part 1. The micro-shutter is provided with a light source 110 adjacent thereto.

The substrate 100 includes transparent insulating materials such as glass, plastic, and quartz.

The reflective layer 50 is formed on the substrate 100 to reflect external light, for example, light emitted from the light source 110.

The reflective layer 50 includes a plurality of first openings 51. The first openings 51 provide paths through which a portion of external light passes. External light traveling in a remaining region other than the first openings 51 is reflected by the reflective layer 50.

The light source 110 supplies light to the micro-shutter. When the light source 110 is provided at one side of a lower portion of the substrate 100 as shown in FIG. 3, the reflective layer 50 reflects or transmits light traveling upwardly from the light source 110.

The first openings 51 block or transmit external light corresponding to second openings 71 of a shutter 70. The second openings 71 of the shutter 70 will be described below.

According to an exemplary embodiment, two first openings 51 have the same size. However, in other exemplary embodiments, the first openings 51 may have sizes different from each other, and the number of first openings 51 may also vary. For example, if two first openings 51 are formed, one of the first openings 51 may have a certain size, and the other of the first openings 51 may have a larger size than that of the one.

The shutter part 1 includes the shutter 70 and a first actuator OP1 moving the shutter 70.

The shutter 70 is has a plate-like shape, and is provided in parallel to the substrate 100. The shutter 70 includes an opaque material to block light.

The second opening 71 is provided in the shutter 70 corresponding to the first opening 51. The second openings 71 are the same as the first openings 51 in terms of shape, size, and number. Thus, when the second openings 71 are overlapped with the first openings 51, the number and the shape of the second openings 71 are matched with those of the first openings 51. According to another exemplary embodiment, the second openings 71 may be different from the first openings 51 in terms of number and shape.

The first actuator OP1 is provided at one side of the shutter 70. The first actuator OP1 moves the shutter 70 in a first direction D1 which is a direction from the shutter 70, toward the first actuator OP1 while maintaining the shutter 70 in parallel to and spaced apart from the surface of the substrate 100. The shutter 70 moves in the first direction D1 due to the driving of the first actuator OP1. Reference numeral D2 represents a direction opposite to the first direction D1.

The first actuator OP1 includes at least three electrodes.

The first actuator OP1 includes the first to third compliant electrodes 10, 20, and 30. The first to third compliant electrodes 10, 20, and 30 are spaced apart from each other at a predetermined distance. The first to third compliant electrodes 10, 20, and 30 are sequentially arranged in the first direction. In other words, the second compliant electrode 20 is adjacent to the first compliant electrode 10. The third compliant electrode 30 is adjacent to the second compliant electrode 20 which is interposed between the third compliant electrode 30 and the first compliant electrode. The third compliant electrode 30 is directly connected with the shutter 70.

The first to third compliant electrodes 10, 20, and 30 include support parts 13, 23, and 33, and compliant parts 11, 21, and 31. The first compliant electrode 10 includes a first support part 13 and a first compliant part 11. The second compliant electrode 20 includes a second support part 23 and a second compliant part 21. The third compliant electrode 30 includes a third support part 33 and a third compliant part 31. The support parts 13, 23, and 33 allow the first to third compliant electrodes 10, 20, and 30 to be fixed on the reflective layer 50. The compliant parts 11, 21, and 31 have a compliant beam-like shape and are connected with the support parts 13, 23, and 33. The compliant parts 11, 21, and 31 are elastic to flexibly move according to an electrostatic force. The support parts 13, 23, and 33 make contact with the substrate 100 and maintain the compliant parts 11, 21, and 31 to be spaced apart from the substrate 100, so that the compliant parts 11, 21, and 31 maintain a predetermined distance from the substrate 100 when moved.

The first support part 13 is formed at the central portion the first compliant electrode 10. The first compliant part 11 extends from both sides of the first support part 13, and also extends in an extension direction from one lateral side of the shutter 70. The second compliant electrode 20 includes two sections separated from each other while being spaced apart from the lateral side of the shutter 70. Both sections include the second compliant part 21 and the second support part 23, respectively. One end of the second compliant part 21 of one section faces one end of the second compliant part 21 of the other section. The second support parts 23 are disposed at the other ends of the second compliant parts 21. The third compliant electrode 30 is interposed between the second compliant electrode 20 and the shutter 70, and the third support part 33 is adjacent to the second support part 23. The third compliant part 31 extends along the second compliant part 21 while being spaced apart from the second compliant part 21 by a predetermined interval. The third compliant electrode 30 also includes two sections separated from each other while being spaced apart from the lateral side of the shutter 70. Both sections include the third compliant part 31 and the third support part 33, respectively. One end of the third compliant part 31 of one section faces one end of the third compliant part 31 of the other section, and an end of an extension part of the third compliant part 31 is bent toward the shutter 70 such that the one end of each compliant part 31 is connected to the shutter 70. The third support parts 33 are disposed at the other ends of the third compliant parts 31.

The second compliant electrode 20 is less flexible than the first and third compliant electrodes 10 and 30. To make the second compliant electrode 20 be less flexible than the first and third compliant electrodes 10 and 30, the thickness or width of the second compliant part 21 may be greater than the thickness or width of the first and third compliant parts 11 and 31. Also, the second compliant part 21 may include a material having lower flexibility than that of materials of the first and third compliant parts 11 and 30.

The support parts 13, 23, and 33 and the compliant parts 11, 21, and 31 of the first to third compliant electrodes 10 to 30 may have various widths and sizes.

Hereinafter, the operating procedure of a micro-shutter having the above structure according to an exemplary embodiment of the present invention will be described.

Figure 4A:
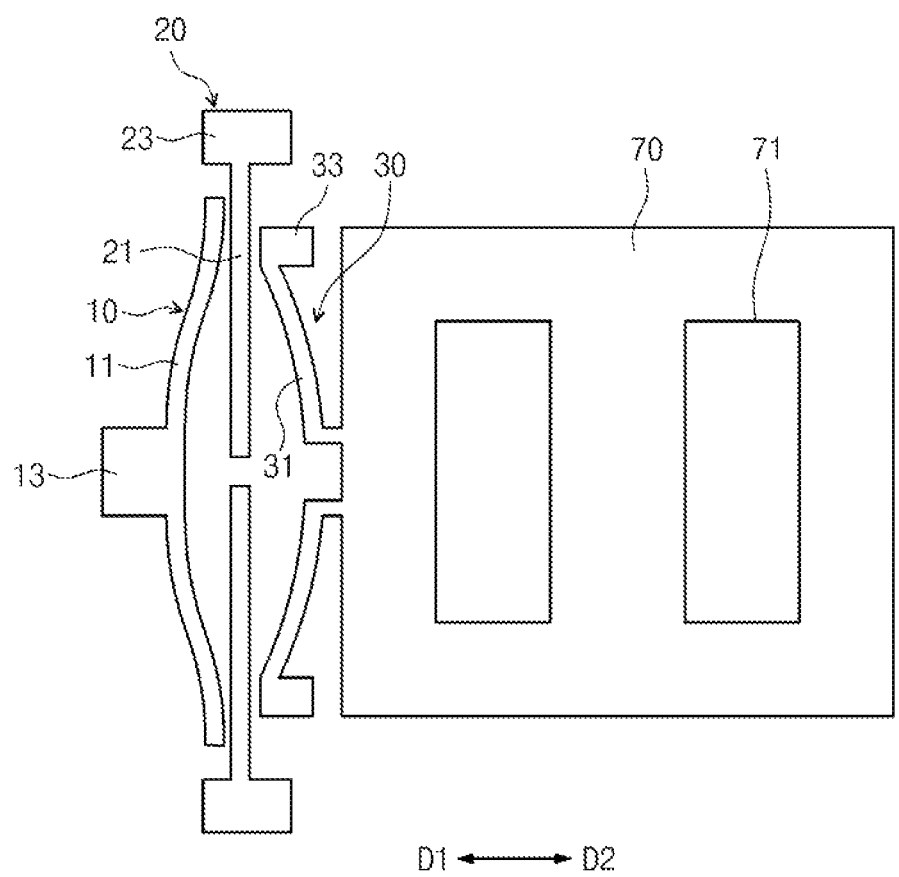
FIGS. 4A to 4C are plan views showing the micro-shutter according to the exemplary embodiment of FIG. 1 when the micro-shutter is driven.
Figure 4B:
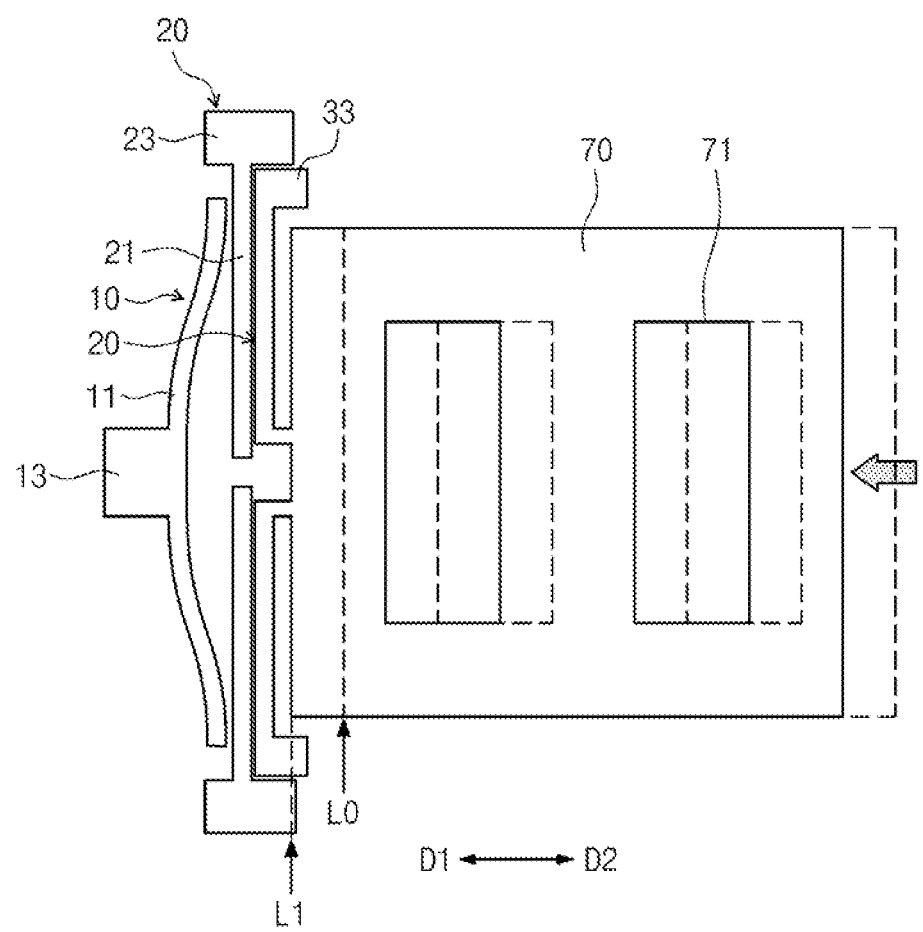
Figure 4C:
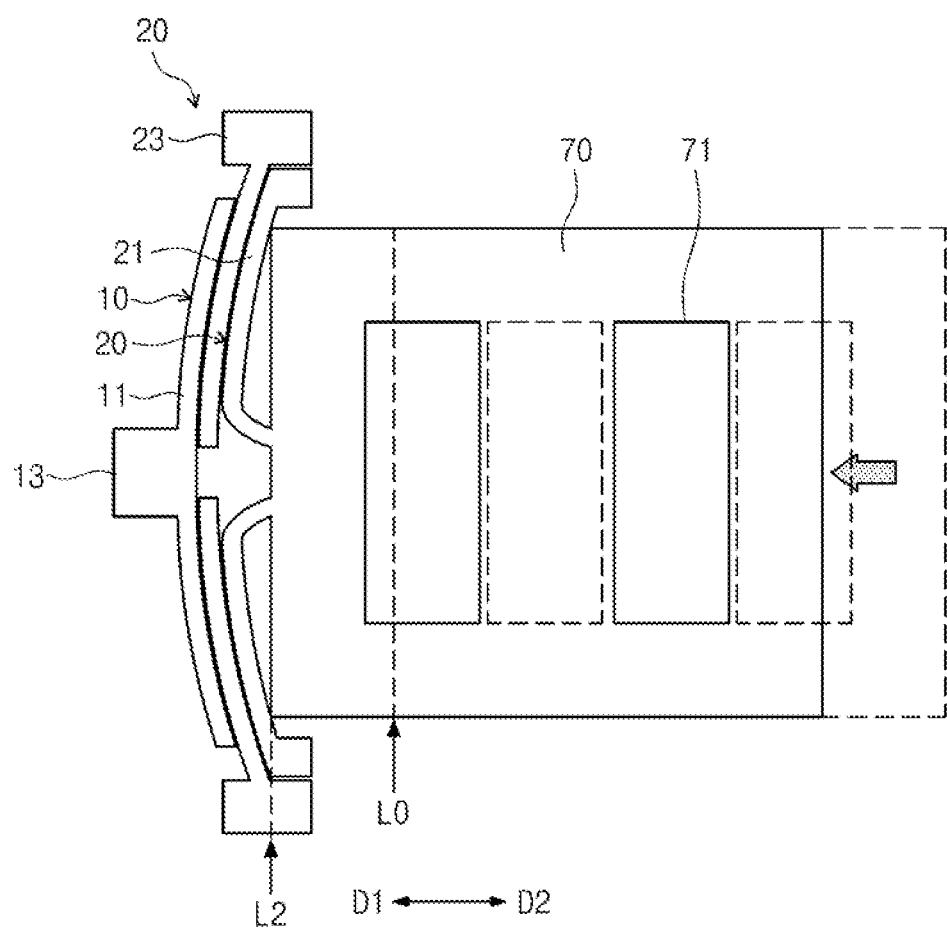
Figure 5A:
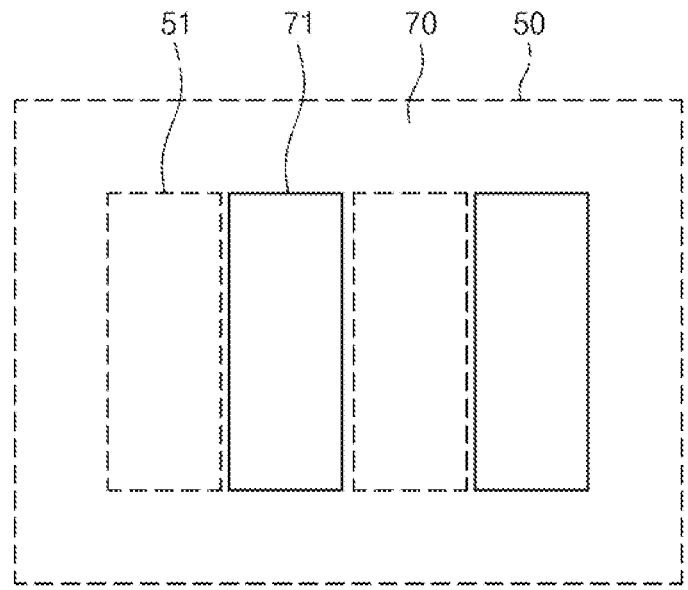
FIGS. 5A to 5C are plan views showing the position relation between first and second openings according to the driving states of the micro-shutter of FIGS. 4A to 4C, respectively.
Figure 5B:
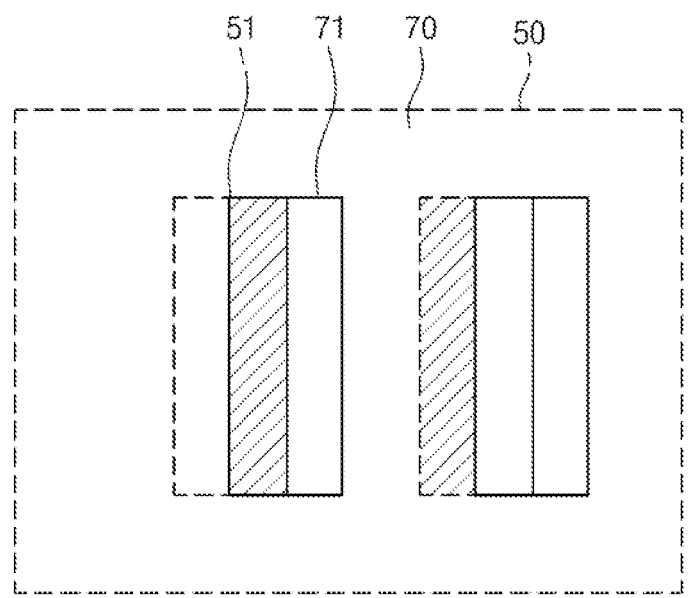
Figure 5C:
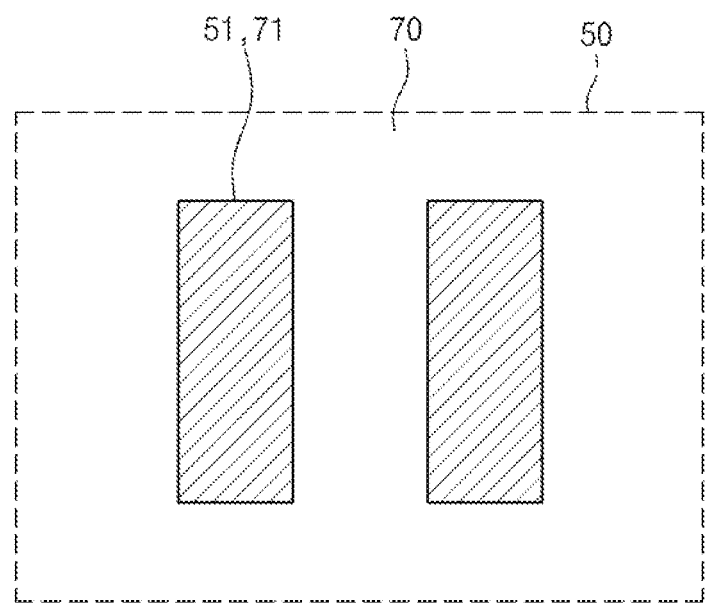

FIGS. 4A to 4C are plan views showing a micro-shutter according to an exemplary embodiment of the present invention when the micro-shutter is driven. FIGS. 5A to 5C are plan views showing the position relation between the first and second openings 51 and 71 according to the driving states of the micro-shutter of FIGS. 4A to 4C, respectively.

FIGS. 4A and 5A are plan views showing the micro-shutter when a voltage is not applied to the first, second, and third compliant electrodes 10, 20, and 30 in the micro-shutter according to an exemplary embodiment of the present invention. As shown in FIGS. 4A and 5A, when a voltage is not applied to the first, second, and third compliant electrodes 10, 20, and 30, the first, second, and third compliant electrodes 10, 20 and 30 are spaced apart from one another. In this case, since the first openings 51 are not overlapped with the second openings 71, the shutter 70 is in a closed state. In addition, since light is not transmitted, the shutter 70 represents black.

FIGS. 4B and 5B are plan views showing the micro-shutter when a first voltage is applied to the first and second compliant electrodes 10 and 20. The first voltage generates an electrostatic force between the first and second compliant electrode 10 and 20 and the third compliant electrode 30. The first voltage brings the third compliant electrode 30 into contact with the second compliant electrode 20 by an electrostatic force. However, the first voltage level is insufficient to bring all of the first, second, and third compliant electrodes 10, 20, and 30 into contact with one another by the electrostatic force between the first and third compliant electrodes 10 and 30.

In other words, if the first voltage is applied to the first and second compliant electrodes 10 and 20, the electrostatic force causes the third compliant electrode 30 connected with the shutter 70 to move and make contact with the second compliant electrode 20. However, since the second compliant electrode 20 is less flexible than the first and third compliant electrodes 10 and 30, and the first voltage is insufficient to move the third compliant electrode 30, the second compliant electrode 20 serves as a barrier to prevent the third compliant electrode 30 from making contact with both of the first and second compliant electrodes 10 and 20. Accordingly, the second compliant electrode 20 is still spaced apart from the first compliant electrode 10, and makes contact with the third compliant electrode 30. As a result, the shutter 70 connected with the third compliant electrode 30 moves in the first direction D1 from an initial position L0 to a first position L1.

Therefore, the second opening 71 is overlapped with the first opening 51 according to the movement of the shutter 70. On the assumption that transmittance is 100% when the second opening 71 is completely overlapped with the first opening 51, that is, the shutter 70 is completely opened, since the shutter 70 overlaps 50% of the area of the first opening 51 in a case shown in FIGS. 4B and 5B, the transmittance is 50%, representing a gray shade.

FIGS. 4C and 5C are plan views showing the micro-shutter when a second voltage is applied to the first and second compliant electrodes 10 and 20. The second voltage is greater than the first voltage. The second voltage has a magnitude sufficient to bring all of the first, second and third compliant electrodes 10, 20, and 30 into contact with one another by the electrostatic force between the first and third compliant electrodes 10 and 30. In other words, when the second voltage is applied to the first and second compliant electrodes 10 and 20, the electrostatic force between the first and second compliant electrodes 10 and 20 and the third compliant electrode 30 is greater than the electrostatic force when the first voltage is applied to the first and second compliant electrodes 10 and 20. The electrostatic force between the first to third compliant electrodes 10 to 30 is great enough to overcome the barrier caused by low flexibility of the second compliant electrode 20. Accordingly, the first compliant electrode 10 makes contact with the second compliant electrode 20 and the second compliant electrode 20 makes contact with the third compliant electrode 30. Thus, the shutter 70 connected to the third compliant electrode 30 moves a distance in the first direction D1 equal to the movement distance of the third compliant electrode 30, to move the shutter 70 into a second position L2.

In the second position, the second opening 71 is completely overlapped with the first opening 51. In this case, since 100% of the shutter 70 is open, the transmittance becomes 100%, representing white.

When a voltage is not applied to any one of the first, second, and third compliant electrodes 10, 20, and 30, the first, second, and third compliant electrodes 10, 20, and 30 return to original positions thereof due to elasticity.

As described above, a micro-shutter according to an exemplary embodiment of the present invention represents a gray scale according to the overlap degree of the first and second openings 51 and 71 in addition to black and white.

Figure 6A:
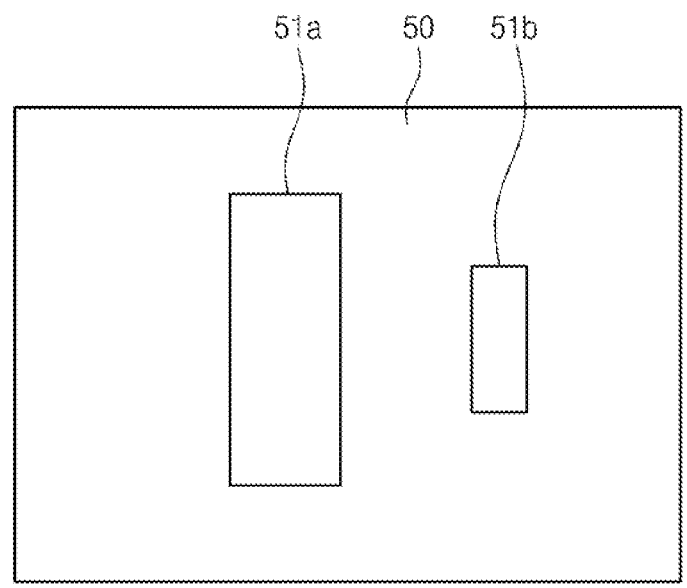
FIGS. 6A and 6B are views showing the shape of a shutter and a reflective layer in a micro-shutter according to a another exemplary embodiment of the present invention.
Figure 6B:
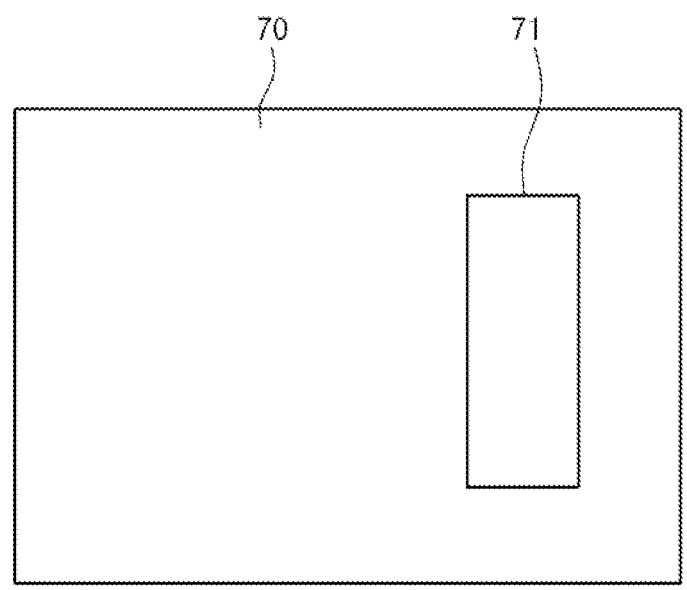

In a micro-shutter according to an exemplary embodiment of the present invention, the plural first openings 51 may have various sizes. FIGS. 6A and 6B are views showing the shape of the shutter 70 and the reflective layer 50 in a micro-shutter, respectively, according to another exemplary embodiment of the present invention in which the first openings 51 have different sizes. Hereinafter, another exemplary embodiment of the present invention will be described below with reference to FIGS. 1 to 3 while focusing on the difference with respect to the exemplary embodiment of FIGS. 4A-C and 5A-C to avoid redundancy.

As shown in FIGS. 6A and 6B, a micro-shutter according to an exemplary embodiment of the present invention includes the first openings 51 including a first sub opening 51a and a second sub opening 51b smaller than the first sub opening 51a. The sizes of the first and second sub openings 51a and 51b may be adjusted at various ratios according to desired gray scales (or light transmittance). For example, the second sub opening 51b may have an area corresponding to 10%, 25%, or 50% of the area of the first sub opening 51a. Hereinafter, a case in which the second sub opening 51b has an area corresponding to 25% of the area of the first sub opening 51a, will be described as an example. In this case, the second opening 71 has a size and a shape the same as those of the first sub opening 51a.

Figure 7A:
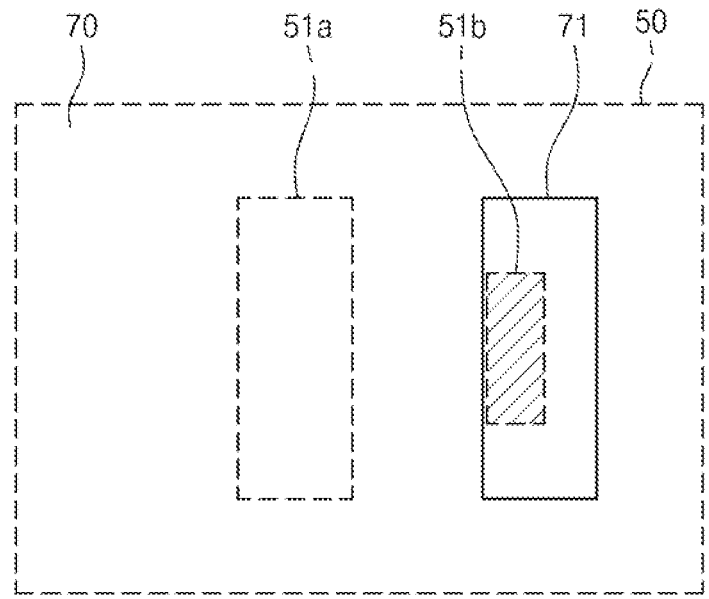
FIGS. 7A to 7C are plan views showing the position relation between first and second openings according to the driving states of the micro-shutter according to the embodiment of FIGS. 6A-B.
Figure 7B:
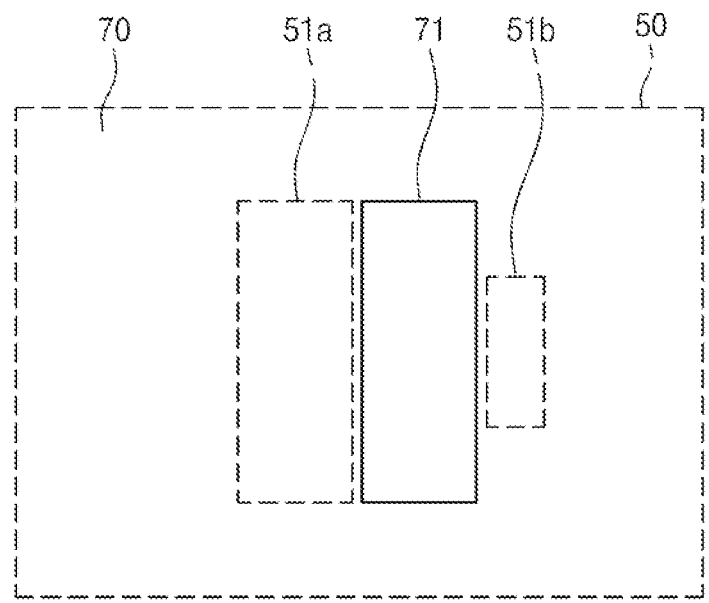
Figure 7C:
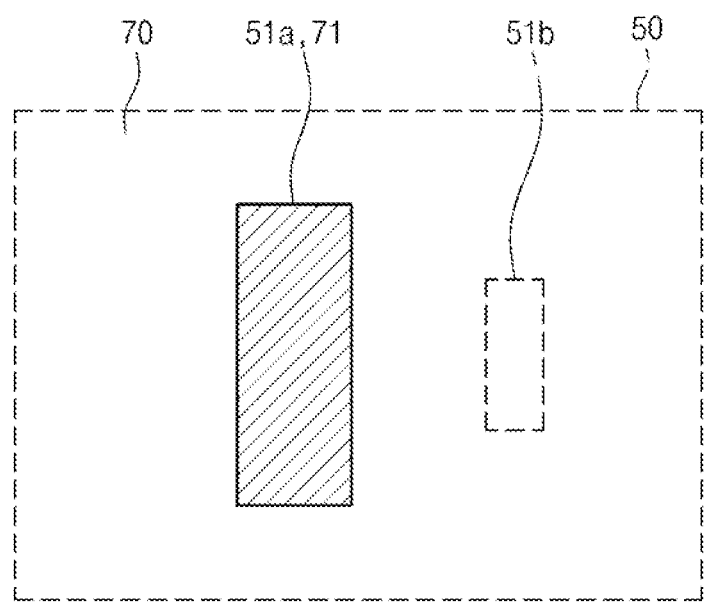

FIGS. 7A to 7C are plan views showing the relative positions of the first and second openings 51 and 71 according to the driving states of the micro-shutter according to an exemplary embodiment of the present invention, respectively.

FIG. 7A is a plan view showing the micro-shutter when a voltage is not applied to the first, second, and third compliant electrodes 10, 20, and 30 of the first actuator OP1 of the micro-shutter. The second opening 71 is overlapped with the second sub opening 51b of the first opening 51. On the assumption that transmittance becomes 100% when the first sub opening 51a is completely overlapped with the second opening 71, since the second sub opening 51b has an area corresponding to 25% of the area of the first sub opening 51a, transmittance is 25% when the second sub opening 51b is completely overlapped with the second opening 71.

FIG. 7B is a plan view showing the micro-shutter when the first voltage is applied to the micro-shutter in a manner similar to that of the exemplary embodiment of FIGS. 4A-C and 5A-C. When the first voltage is applied to the first actuator OP1 of the micro-shutter according to this exemplary embodiment, the micro-shutter moves a distance in the first direction D1 equal to the movement distance of the third compliant electrode 30. Accordingly, the second opening 71 is positioned between the first and second sub openings 51a and 51b of the first opening 51, so that the second opening 71 does not overlap the first opening 51. As a result, the micro-shutter has 0% transmittance, representing black.

FIG. 7C is a plan view showing the micro-shutter when the second voltage is applied to the micro-shutter in a manner similar to that of the exemplary embodiment of FIGS. 4A-C and 5A-C. In this case, the second opening 71 of the shutter 70 completely overlaps the first opening 51, so that the micro-shutter has 100% of transmittance, representing white.

Although the first actuator OP1 is shown at one side of the shutter 70 according to the exemplary embodiments of FIGS. 4A-C, 5A-C, and 7A-C, another actuator may be provided at the other side of the shutter 70 according to other exemplary embodiments of the present invention.

Figure 8:
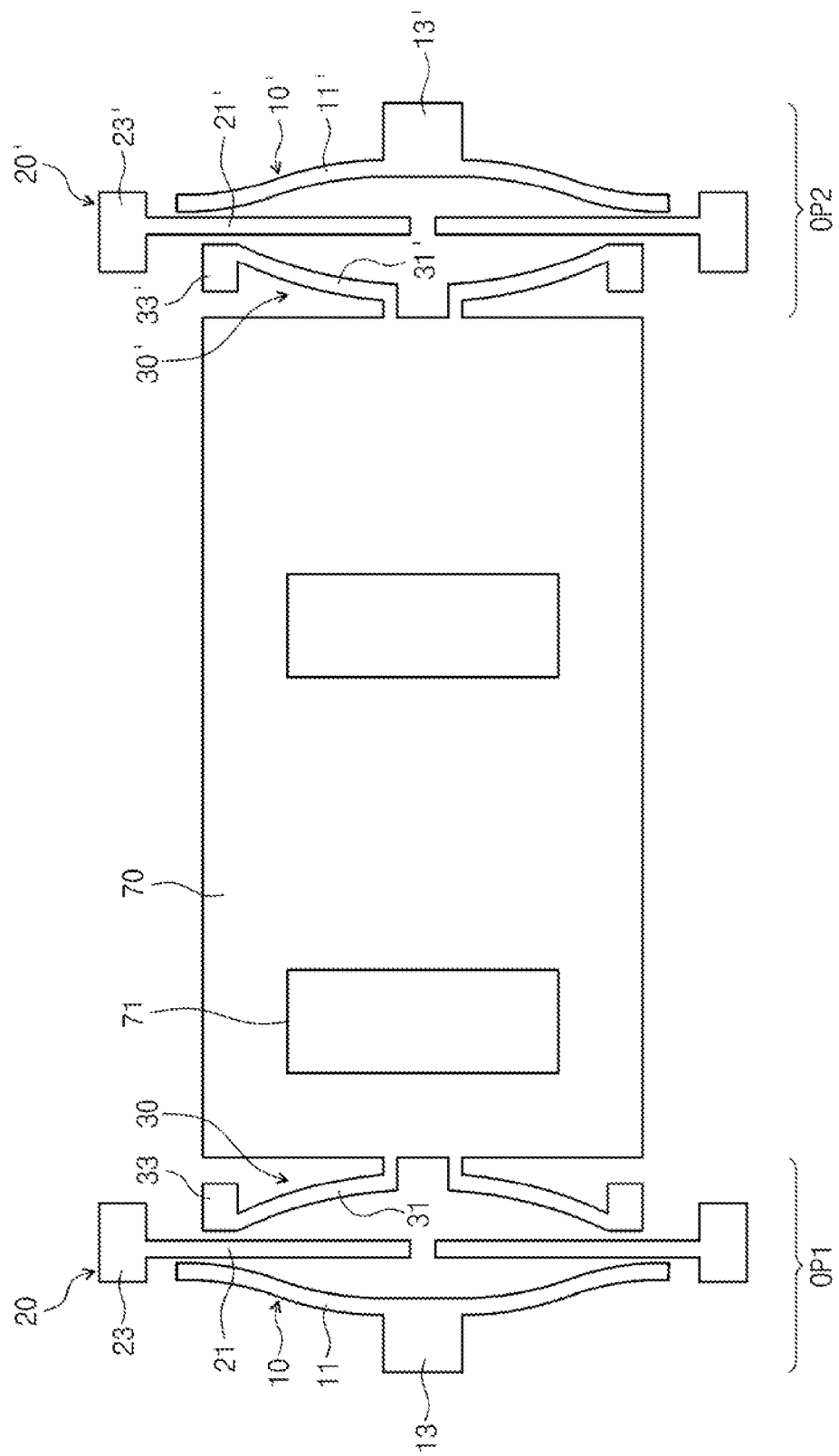
FIG. 8 is a plan view showing a micro-shutter according to a another exemplary embodiment of the present invention.
Figure 9A:
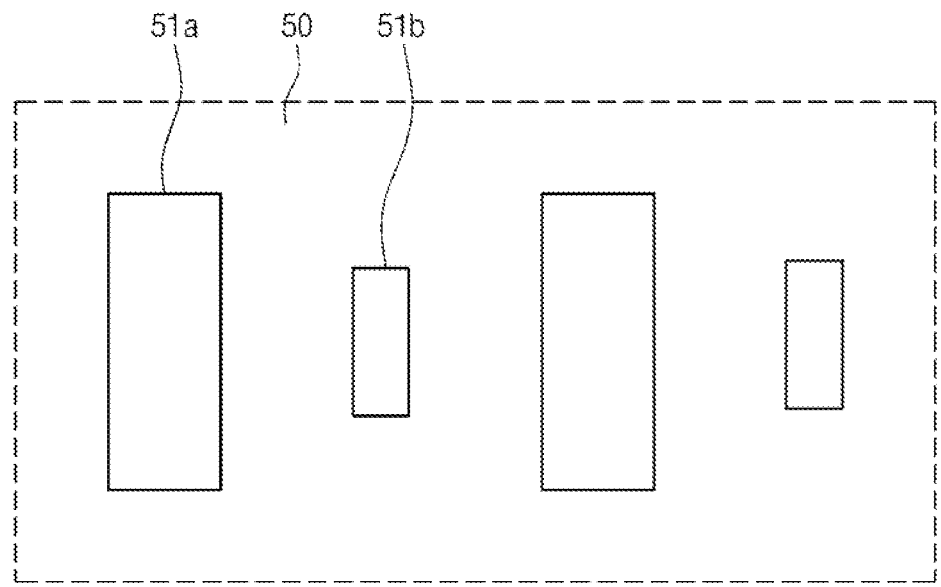
FIGS. 9A and 9B are plan view showing the shape of a shutter and a reflective layer in the micro-shutter according to the exemplary embodiment of FIG. 8.
Figure 9B:
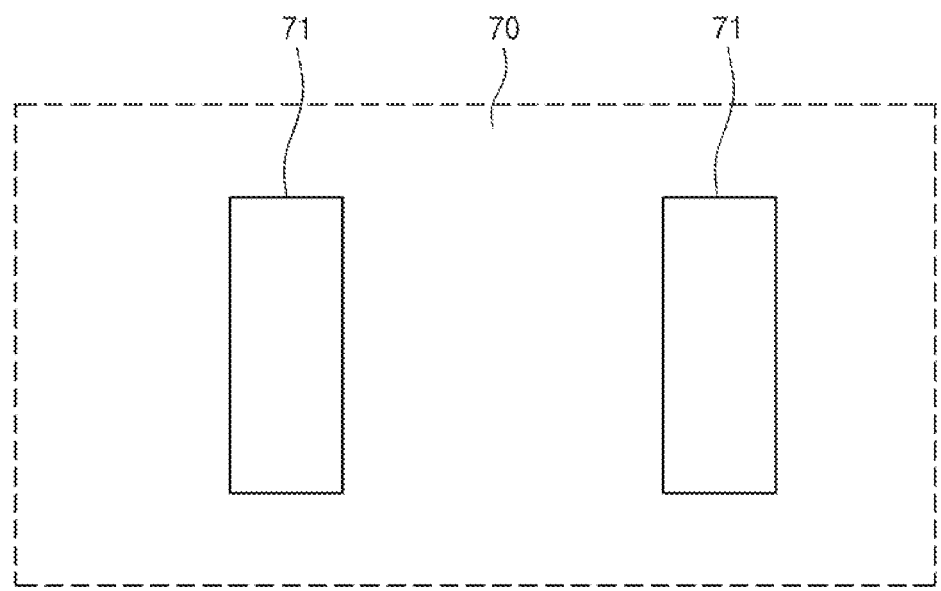

FIG. 8 is a plan view showing a micro-shutter according to another exemplary embodiment of the present invention. FIGS. 9A and 9B are plan views showing the shape of the shutter 70 and the reflective layer 50 of the micro-shutter according to this exemplary embodiment of the present invention, in which a second actuator OP2 is provided at the other side of the shutter 70. Hereinafter, the exemplary embodiment FIG. 8 of the present invention will be described below with reference to FIGS. 1 to 3 while focusing on the difference with respect to the exemplary embodiment of FIGS. 4A-C and 5A-C to avoid redundancy.

As shown in FIGS. 8, 9A, and 9B, a second actuator OP2 is provided in the micro-shutter according to another exemplary embodiment of the present invention. The second actuator OP2 is provided at the opposite side of the shutter 70 from the first actuator OP1, while being symmetric to the first actuator OP1 about the shutter 70. The second actuator OP2 moves the shutter 70 in a direction opposite to the driving direction of the first actuator OP1, that is, a second direction D2. Therefore, since the second actuator OP2, along with the elasticity of the first actuator OP1, easily moves the shutter in the second direction D2, a micro-shutter according to the this exemplary embodiment has faster response speed than that of the shutter according to the embodiments of FIGS. 4A-C, 5A-C, and 7A-C.

The second actuator OP2 has the same structure as the first actuator OP1, and includes a fourth compliant electrode 10', a fifth compliant electrode 20', and a sixth compliant electrode 30' in such a manner than the shutter 70 moves in the second direction D2. The fourth, fifth, and sixth compliant electrodes 10', 20', and 30' of the second operator OP2 correspond to the first, second, and third compliant electrodes 10, 20, and 30 of the first actuator OP1, respectively. Reference numerals of the second actuator OP2, which have not been described yet, correspond to elements of similar reference numerals of the first actuator OP1. The driving scheme of the second actuator OP2 is the same as that of the first actuator OP1 except for the movement direction of the shutter 70.

The first opening 51 of the micro-shutter according to an exemplary embodiment of the present invention includes a plurality of first sub openings 51a and a plurality of second sub openings 51b smaller than the first sub openings 51a. The first and second sub openings 51a and 51b are alternately aligned one by one. The sizes of the first and second sub openings 51a and 51b may be adjusted at various ratios according to desired gray scales (or light transmittance). According to one exemplary embodiment, the area of the second sub opening 51b is 25% of the area of the first sub opening 51a. The second opening 71 has the same size and shape as those of the first sub opening 51a.

FIGS. 10A to 10E are plan views showing the relative positions of the first and second openings 51 and 71 according to the driving states of the micro-shutter according to an exemplary embodiment of the present invention.

Figure 10A:
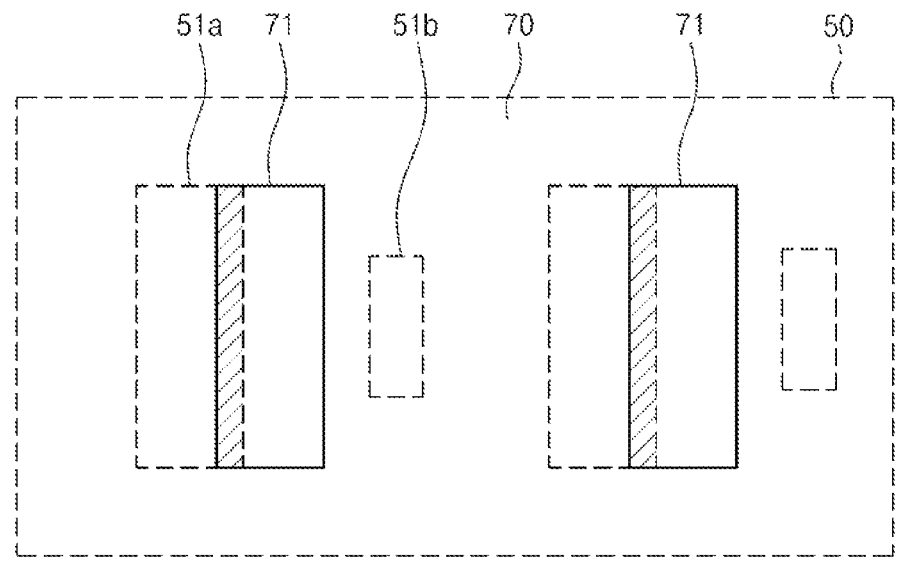
FIGS. 10A to 10E are plan views showing the position relation between first and second openings according to the driving states of the micro-shutter according to the exemplary embodiment of FIG. 8.

FIG. 10A is a plan view showing the micro-shutter when a voltage is not applied to the first and second actuators OP1 and OP2 in the micro-shutter. In this case, each second opening 71 of the micro-shutter overlaps a portion of the first sub opening 51a of the first opening 51 corresponding to about ⅓ of the area of the first sub opening 51a. Accordingly, transmittance is about 33%, representing a gray shade, on the assumption that transmittance is 100%, representing white, when the second opening 71 completely overlaps the first sub opening 51a.

Figure 10B:
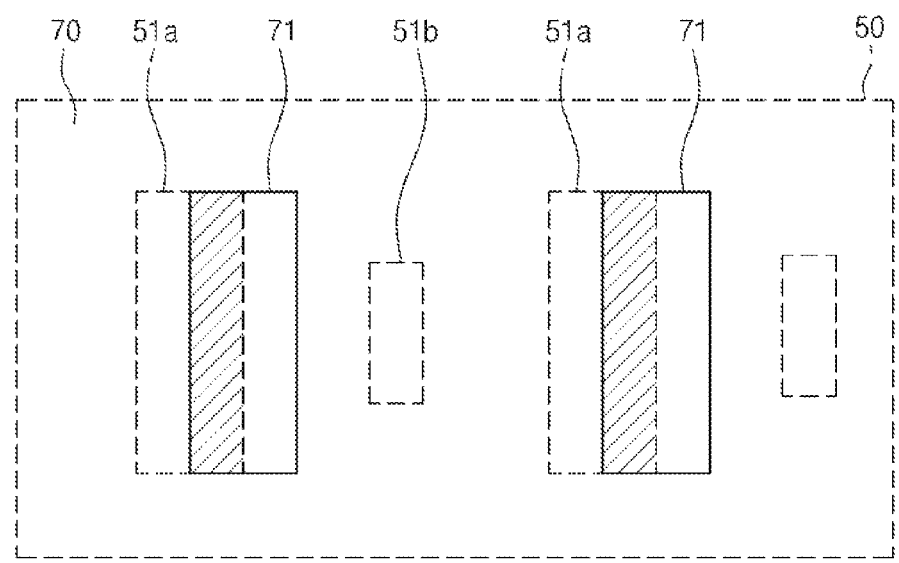

FIG. 10B is a plan view showing the micro-shutter when the first voltage is applied to the first actuator OP1 of the first and second actuators OP1 and OP2. In this case, the shutter 70 of the micro-shutter moves in the first direction D1. Accordingly, the second opening 71 overlaps about 50% of the area of the first sub opening 51a, with about 50% transmittance, representing a gray shade lighter than that of FIG. 10A.

Figure 10C:
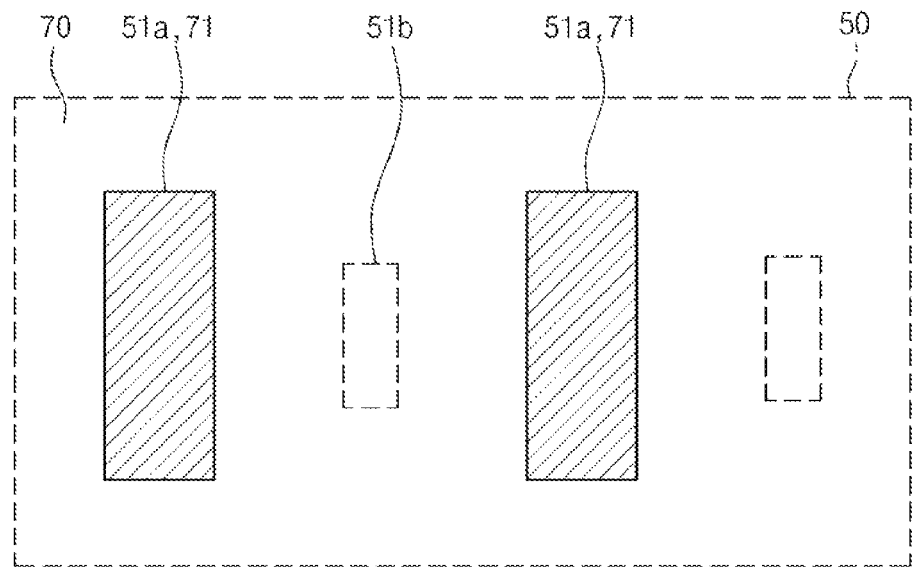

FIG. 10C is a plan view showing the micro-shutter when the second voltage is applied to the first actuator OP1 of the first and second actuators OP1 and OP2. In this case, the shutter 70 of the micro-shutter moves in the first direction D1.

The position of the shutter 70 is closer to the first actuator OP1 than the position of the shutter 70 shown in FIG. 10B. Accordingly, the second opening 71 completely overlaps the first sub opening 51a of the first opening 51, for 100% transmittance. Accordingly, the micro-shutter represents white.

Figure 10D:
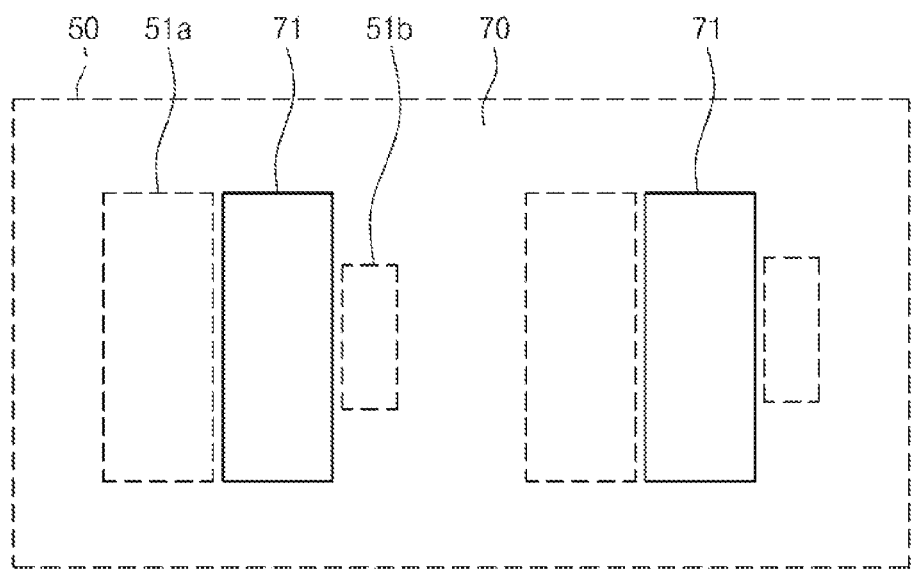

FIG. 10D is a plan view showing the micro-shutter when the first voltage is applied to the second actuator OP2 of the first and second actuators OP1 and OP2. In this case, the shutter 70 of the micro-shutter moves in the second direction D2 as compared with when a voltage is not applied. Accordingly, the second opening 71 does not overlap with any one of the first and second sub openings 51a and 51b. Accordingly, transmittance is 0%, so that the micro-shutter represents black.

Figure 10E:
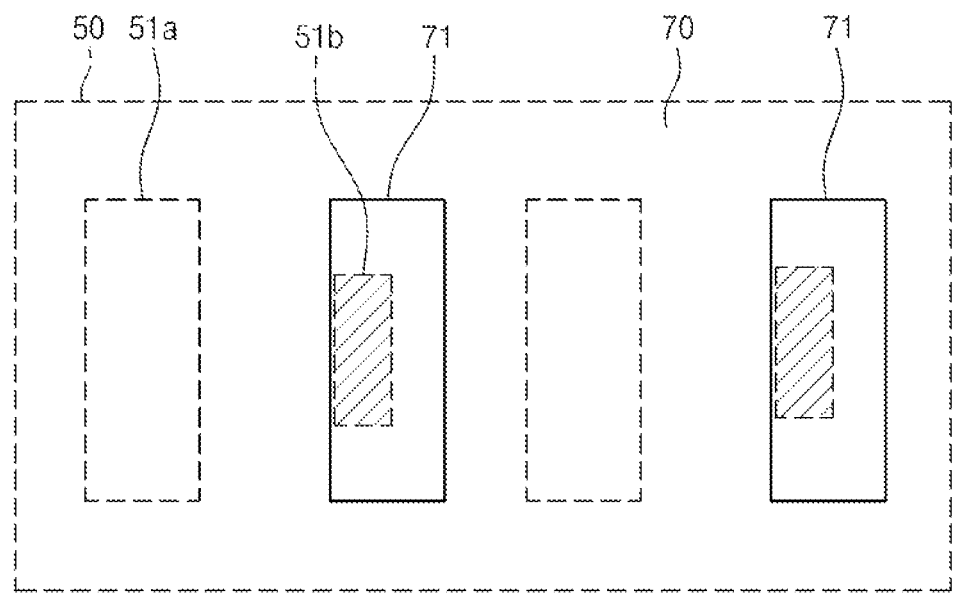

FIG. 10E is a plan view showing the micro-shutter when the second voltage is applied to the second actuator OP2 of the first and second actuators OP1 and OP2. The shutter 70 of the micro-shutter moves in the second direction D2. The position of the shutter 70 is closer to the second actuator OP2 than the position of the shutter 70 of FIG. 10D. As a result, the second opening 71 completely overlaps the second sub opening 51b, for a transmittance of about 25%. Accordingly, the micro-shutter represents a gray shade darker than that of FIG. 10A.

According to the exemplary embodiments of the present invention, when a plurality of first openings 51 including the first and second sub openings 51a and 51b are provided, the position, shape, and size of the first openings 51 may be varied to adjust the overlap degree between the first openings 51 and the second openings 71.

Figure 11:
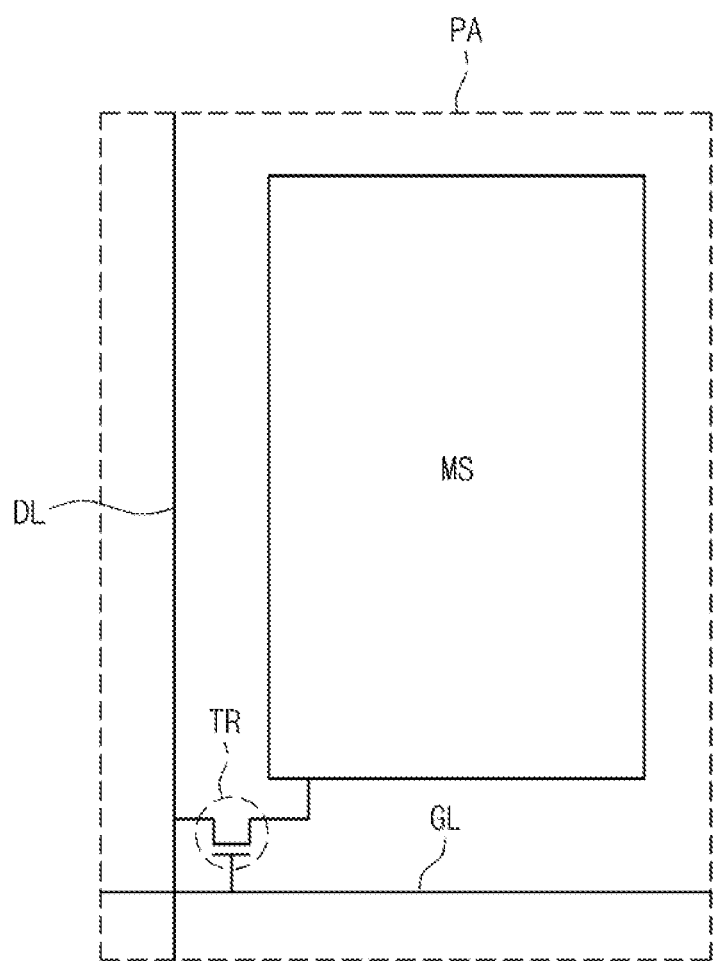
FIG. 11 is a circuit diagram schematically showing a display apparatus according to a exemplary embodiment of FIG. 1.
Figure 12:
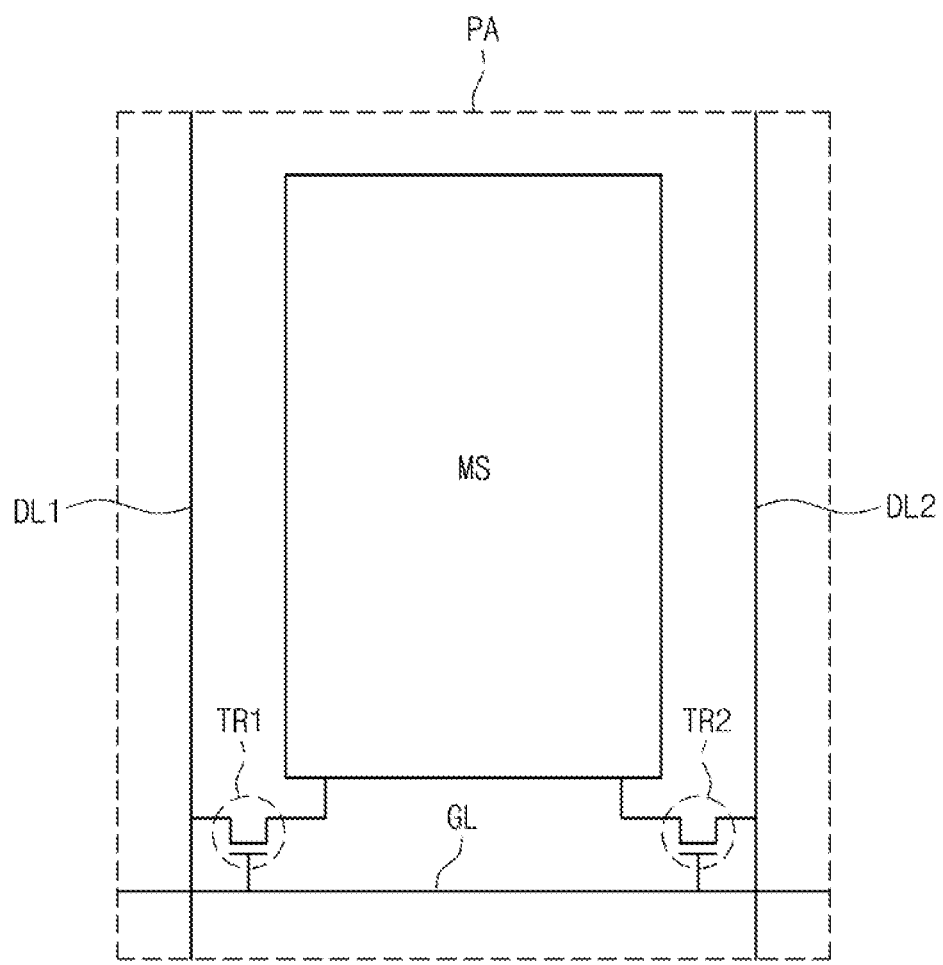
FIG. 12 is a circuit diagram schematically showing a display apparatus according to an exemplary embodiment of FIGS. 6A-B.

According to another exemplary embodiment of the present invention, a display apparatus including the micro-shutter is provided. FIG. 11 is a circuit diagram schematically showing a display apparatus according to an exemplary embodiment of the invention. FIG. 12 is a circuit diagram schematically showing a display apparatus according to another exemplary embodiment.

In the following description about a display apparatus according to the present embodiment, repeated details of the micro-shutters according to various exemplary embodiments will be omitted to avoid redundancy. For the purpose of explanation, one from among a plurality of pixel areas PA is shown in drawings, and all pixel areas PA have the same structure.

Referring to FIG. 11. a display apparatus according to an exemplary embodiment of the present invention includes a substrate. A plurality of pixel areas PA are formed on the substrate. A gate line GL, a data line DL, a transistor TR, and a micro-shutter MS are disposed in each pixel area PA. The gate line GL extends in one direction on the substrate, and the data line DL crosses the gate line GL. The transistor TR is formed at a point in which the data line DL crosses the gate line GL. The transistor is connected with the gate line GL and the data line DL. The micro-shutter MS is electrically connected with the transistor TR.

The micro-shutter MS may be provided according to any of the various exemplary embodiments of the micro-shutter. In this case, the first actuator OP1 of the micro-shutter MS according to an exemplary embodiment is connected with the transistor TR.

A display apparatus having the above structure is driven by providing a pixel signal from the data line DL to the micro-shutter MS in response to a scan signal from the gate line GL. As a result, the micro-shutter MS changes light transmittance to display an image.

Referring to FIG. 12, a display apparatus according to another exemplary embodiment of the present invention includes a substrate. A plurality of pixel areas PA are formed on the substrate. A gate line GL, a first data line DL1, a second data line DL2, a first transistor TR1, a second transistor TR2, and the micro-shutter MS are disposed in the pixel area PA.

The gate line GL extends in one direction on the substrate, and the first and second data lines DL1 and DL2 cross the gate line GL. The first transistor TR1 is provided at a point in which the gate line GL crosses the first data line DL1, and the second transistor TR2 is provided at a point in which the gate line GL crosses the second data line DL2. The micro-shutter MS is electrically connected with the first and second transistors TR1 and TR2. In this case, the micro-shutter MS may be provided according to the exemplary embodiment of FIGS. 8, 9A, and 9B. The first transistor TR1 is connected with the first actuator OP1 of the micro-shutter MS according to this exemplary embodiment, and the second transistor TR2 is connected with the second actuator OP2 of the micro-shutter MS according to this exemplary embodiment.

A display apparatus having the above structure is driven by providing pixel signals from the first and second data lines DL1 and DL2 to the micro-shutter MS in response to a scan signal from the gate line GL. As a result, the micro-shutter MS changes light transmittance to display an image.

In a display apparatus according to the exemplary embodiment of the present invention of FIGS. 7A-C, the first and second transistors TR1 and TR2 operating the micro-shutter MS are independently driven by providing individual pixel signals through the first and second data lines DL1 and DL2 as described above. The first and second compliant electrodes 10 and 20 of the first actuator OP1 of each micro-shutter MS are connected with the first transistor TR1, and the fourth and fifth compliant electrodes 10' and 20' of the second actuator OP2 are connected with the second transistor TR2.

According to another exemplary embodiment of the present invention, the first and second compliant electrodes 10 and 20 of the first actuator OP1 can be operated independently from each other. The fourth and fifth compliant electrodes 10' and 20' of the second actuator OP2 can be operated independently from each other. In this case, the first transistor TR1 may be connected with the first compliant electrode 10 of the first actuator OP1, and a first sub transistor may be connected with the second compliant electrode 20. The second transistor TR2 may be connected with the fourth compliant electrode 10' of the second actuator OP2, and a second sub transistor may be connected with the fifth compliant electrode 20'.

As described above, different from a conventional micro-shutter representing only black and white, a micro-shutter according to various embodiments of the present invention can represent various middle gray scales. Since the conventional micro-shutter represents only black and white, a plurality of conventional micro-shutters must be independently used to represent middle gray scales. For example, to represent a gray scale having 50% transmittance, two micro-shutters must be provided in one cell. In this case, two micro-shutters are formed in one cell, and driving devices such as transistors and metal interconnections must be added to two micro-shutters, respectively. In another scheme, one micro-shutter may be opened, several times at a predetermined interval to represent gray scales. This scheme requires a transistor capable of driving the micro-shutter at a high speed. However, according to various embodiments of the present invention, at least three gray scales can be represented by using one micro-shutter. Accordingly, various gray scales can be represented by using fewer micro-shutters than conventional micro-shutters. In addition, according to embodiments of the present invention, since middle gray scales can be represented without multiple openings of the micro-shutter, the micro-shutter can be driven by a low-speed transistor.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A micro-shutter comprising:
    a reflective layer comprising a plurality of first openings transmitting a portion of external light, and reflecting a remaining portion of the external light;
    a shutter comprising a plurality of second openings corresponding to the first openings to transmit the portion of the external light; and
    a first actuator provided at one side of the shutter and comprising at least three electrodes,
    wherein an overlap area between the first openings and the second openings is adjusted according to a level of a voltage applied to the actuator electrodes.

2. The micro-shutter of claim 1, wherein the first actuator comprises:
    a first compliant electrode;
    a second compliant electrode which is adjacent to the first compliant electrode; and
    a third compliant electrode adjacent to the second compliant electrode which is interposed between the third compliant electrode and the first compliant electrode, the third compliant electrode being connected with the shutter.

3. The micro-shutter of claim 2, wherein if a first voltage is applied to the second compliant electrode, the shutter locates to a first position and the second compliant electrode contacts the third compliant electrode, and if a second voltage greater than the first voltage is applied to the first compliant electrode, the shutter locates to a second position, the first compliant electrode contacts the second compliant electrode and the second compliant electrode contacts the third compliant electrode.

4. The micro-shutter of claim 2, further comprising a second actuator provided at an opposite side of the shutter and comprising at least three electrodes,
    wherein the overlap area is adjusted according to a level of a voltage applied to the electrodes of the first actuator and the second actuator.

5. The micro-shutter of claim 4, wherein the second actuator comprises:
    a fourth compliant electrode;
    a fifth compliant electrode which is adjacent to the fourth compliant electrode; and
    a sixth compliant electrode adjacent to the fifth compliant electrode which is interposed between the sixth compliant electrode and the fourth compliant electrode, the sixth compliant electrode being connected with the shutter.

6. The micro-shutter of claim 5, wherein if a first voltage is applied to the fifth compliant electrode, the shutter locates to a third position and the fifth compliant electrode contacts the sixth compliant electrode and if a second voltage greater than the first voltage is applied to the fourth compliant electrode, the shutter locates to a fourth position, the fourth compliant electrode contacts the fifth compliant electrode and the fifth electrode contacts the sixth compliant electrode.

7. The micro-shutter of claim 1, wherein the first openings have sizes different from each other.

8. The micro-shutter of claim 7, wherein the first openings comprise a first sub opening having a first size, and a second sub opening having a size smaller than the first size.

9. The micro-shutter of claim 7, wherein the second sub openings have a size and a shape identical to a size and a shape of the first sub openings.

10. A display apparatus comprising:
    a substrate including a plurality of pixel areas; and
    a plurality of micro-shutters, wherein a micro-shutter is formed in each pixel area,
    wherein each micro-shutter comprises:
        a reflective layer comprising a plurality of first openings transmitting a portion of external light, and reflecting a remaining portion of external light;
        a shutter comprising a plurality of second openings corresponding to the first openings to transmit the portion of the external light; and
        a first actuator provided at one side of the shutter and comprises at least three electrodes,
        wherein an overlap area between the first openings and the second openings is adjusted according to a level of a voltage applied to the actuator electrodes.

11. The display apparatus of claim 10, further comprising a second actuator provided at an opposite side of the shutter and comprising at least three electrodes,
    wherein the overlap area is adjusted according to a level of a voltage applied to the electrodes of the first actuator and the second actuator.

12. The display apparatus of claim 11, wherein the first actuator comprises:
    a first compliant electrode;
    a second compliant electrode which is adjacent to the first compliant electrode; and
    a third compliant electrode adjacent to the second compliant electrode which is interposed between the third compliant electrode and the first compliant electrode, the third compliant electrode being connected with the shutter, and
    wherein the second actuator comprises:
        a fourth compliant electrode;
        a fifth compliant electrode which is adjacent to the fourth compliant electrode; and
        a sixth compliant electrode adjacent to the fifth compliant electrode which is interposed between the sixth compliant electrode and the fourth compliant electrode, the sixth compliant electrode being connected with the shutter.

13. The display apparatus of claim 12, wherein if a first voltage is applied to the second compliant electrode, the shutter moves to a first position and the second compliant electrode contacts the third compliant electrode,
    if a second voltage greater than the first voltage is applied to the first compliant electrode, the shutter moves to a second position, the first compliant electrode contacts the second compliant electrode, and the second compliant electrode contacts the third compliant electrode,
    if the first voltage is applied to the fifth compliant electrode, the shutter moves to a third position and the fifth compliant electrode contacts the sixth compliant electrode, and
    if the second voltage greater than the first voltage is applied to the fourth compliant electrode, the shutter moves to a fourth position, the fourth compliant electrode contacts the fifth compliant electrode and the fifth compliant electrode contacts the sixth compliant electrode.

14. The display apparatus of claim 12, wherein the first and second actuators are driven independently from each other.

15. The display apparatus of claim 14, further comprising:
a first transistor connected with the first and second compliant electrodes of the first actuator; and
a second transistor connected with the fourth and fifth compliant electrodes of the second actuator.

16. The display apparatus of claim 14, further comprising:
a first transistor connected with the first compliant electrode of the first actuator;
a first sub transistor connected with the second compliant electrode of the first actuator;
a second transistor connected with the fourth compliant electrode of the second actuator; and
a second sub transistor connected with the fifth compliant electrode of the second actuator.

17. The display apparatus of claim 10, wherein the first openings comprise a first sub opening having a first size and a second sub opening having a size less than or equal to the first size.

18. The display apparatus of claim 10, further comprising a light source to supply the external light to the substrate.

19. A micro-shutter comprising:
a plate comprising a plurality of first openings that transmit an externally supplied light; and
a first actuator provided at one side of the plate, wherein the first actuator comprises:
a first compliant electrode;
a second compliant electrode which is adjacent to the first compliant electrode; and
a third compliant electrode adjacent to the second compliant electrode which is interposed between the third compliant electrode and the first compliant electrode, the third compliant electrode being connected with the plate.

20. The micro-shutter of claim 19, further comprising a reflective layer comprising a plurality of second openings corresponding to the first openings for transmitting a portion of said external light, and reflecting a remaining portion of the external light, wherein an overlap area between the first openings and the second openings is adjusted according to a level of a voltage applied to the actuator electrodes.

* * * * *